United States Patent
Yoshioka et al.

(10) Patent No.: US 12,143,185 B2
(45) Date of Patent: Nov. 12, 2024

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Yuki Matsumura, Tokyo (JP); Daisuke Murayama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 17/603,181

(22) PCT Filed: Apr. 18, 2019

(86) PCT No.: PCT/JP2019/016690
§ 371 (c)(1),
(2) Date: Oct. 12, 2021

(87) PCT Pub. No.: WO2020/213142
PCT Pub. Date: Oct. 22, 2020

(65) Prior Publication Data
US 2022/0200685 A1 Jun. 23, 2022

(51) Int. Cl.
*H04B 7/06* (2006.01)
*H04W 24/10* (2009.01)
*H04W 92/18* (2009.01)

(52) U.S. Cl.
CPC ........ *H04B 7/0658* (2013.01); *H04B 7/0626* (2013.01); *H04W 24/10* (2013.01); *H04W 92/18* (2013.01)

(58) Field of Classification Search
CPC ... H04B 7/0626; H04B 7/0658; H04W 24/10; H04W 92/18
See application file for complete search history.

(56) References Cited

U.S. PATENT DOCUMENTS

| | | | |
|---|---|---|---|
| 2016/0057761 A1* | 2/2016 | Panaitopol | H04W 72/542 370/329 |
| 2016/0142898 A1* | 5/2016 | Poitau | H04W 8/005 370/329 |
| 2016/0150390 A1* | 5/2016 | Chen | H04W 8/24 370/328 |

(Continued)

FOREIGN PATENT DOCUMENTS

| | | | | |
|---|---|---|---|---|
| CN | 106688288 A | * | 5/2017 | ......... H04W 56/001 |
| WO | 2016/194264 A1 | | 12/2016 | |
| WO | 2018/198446 A1 | | 11/2018 | |

OTHER PUBLICATIONS

Filippou et al., "Coordinated Shared Spectrum Precoding With Distributed CSIT", IEEE Trans. Wireless Communications, vol. 15, No. 8, pp. 5182-5192, Aug. 2016 (Year: 2016).*

(Continued)

*Primary Examiner* — Shah M Rahman
(74) *Attorney, Agent, or Firm* — Osha Bergman Watanabe & Burton LLP (57) ABSTRACT

A user terminal according to one aspect of the present disclosure includes: a control section that determines whether or not to share given channel state information with another user terminal; and a transmission section that transmits the given channel state information determined to be shared to the another user terminal. According to one aspect of the present disclosure, MIMO can be suitably used.

3 Claims, 5 Drawing Sheets

(56) References Cited

U.S. PATENT DOCUMENTS

| | | | | |
|---|---|---|---|---|
| 2017/0310375 | A1* | 10/2017 | Kim | H04B 7/0478 |
| 2018/0007726 | A1* | 1/2018 | Li | H04W 76/10 |
| 2018/0213385 | A1 | 7/2018 | Aminaka et al. | |
| 2019/0199553 | A1* | 6/2019 | Park | H04B 7/0695 |
| 2019/0364582 | A1* | 11/2019 | Boban | H04W 72/52 |
| 2019/0386718 | A1* | 12/2019 | Sengupta | H04B 7/0452 |
| 2020/0280398 | A1* | 9/2020 | Hwang | H04L 5/0091 |
| 2020/0322024 | A1* | 10/2020 | Cheng | H04W 76/11 |
| 2021/0105584 | A1* | 4/2021 | Ohtsuji | H04W 4/70 |
| 2021/0273691 | A1* | 9/2021 | Huang | H04B 7/0473 |
| 2021/0298030 | A1* | 9/2021 | Li | H04W 72/23 |

OTHER PUBLICATIONS

International Search Report for corresponding International Application No. PCT/JP2019/016690, mailed Nov. 19, 2019 (5 pages).
Written Opinion for corresponding International Application No. PCT/JP2019/016690, mailed Nov. 19, 2019 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

USER TERMINAL AND RADIO COMMUNICATION METHOD

TECHNICAL FIELD

The present disclosure relates to user terminal and a radio communication method in a next-generation mobile communication system.

BACKGROUND ART

In a universal mobile telecommunications system (UMTS) network, specifications of long term evolution (LTE) have been drafted for the purpose of further increasing a data rate, providing low latency, and the like (see Non Patent Literature 1). Further, the specifications of LTE-Advanced (third generation partnership project (3GPP) Release. (Rel.) 10 to 14) have been drafted for the purpose of further increasing capacity and advancement of LTE (3GPP Rel. 8 and 9).

Successor systems to LTE (e.g., also referred to as 5th generation mobile communication system (5G), 5G+ (plus), new radio (NR), and 3GPP Rel. 15 or later) are considered.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In the NR, it has been studied to support MIMO which is a further extension of Multi Input Multi Output (MIMO) Spatial Multiplexing introduced in LTE, and to achieve improvement of a communication throughput.

MIMO is greatly affected by spatial correlation. For example, in single user (SU)-MIMO, when channel correlation between antennas in one UE is high, signal separation cannot be performed. Further, in multi user (MU)-MIMO, when channel correlation between a plurality of UEs is high, signal separation cannot be performed.

In MU-MIMO in existing LTE, NR, and the like, there is a problem that, since the UE cannot grasp what channel state other UEs are in, advanced MIMO processing cannot be applied, and throughput performance improvement is suppressed.

It is therefore an object of the present disclosure to provide a user terminal and a radio communication method capable of suitably using MIMO.

Solution to Problem

A user terminal according to one aspect of the present disclosure includes: a control section that determines whether or not to share given channel state information with another user terminal; and a transmission section that transmits the given channel state information determined to be shared to the another user terminal.

Advantageous Effects of Invention

According to one aspect of the present disclosure, MIMO can be suitably used.

DESCRIPTION OF EMBODIMENTS

In the NR, it has been studied to support MIMO which is a further extension of Multi Input Multi Output (MIMO) Spatial Multiplexing introduced in LTE, and to achieve improvement of a communication throughput.

MIMO is greatly affected by spatial correlation. For example, in single user (SU)-MIMO, when channel correlation between antennas in one UE is high, signal separation cannot be performed. Further, in multi user (MU)-MIMO, when channel correlation between a plurality of UEs is high, signal separation cannot be performed.

The UE performs channel measurement, interference measurement, and the like, and reports a result thereof to the network as channel state information (CSI). The CSI may include, for example, Channel Quality Indicator (CQI), Precoding Matrix Indicator (PMI), Rank Indicator (RI), and the like.

In MU-MIMO in existing LTE, NR, and the like, the UE cannot grasp what channel state other UEs are in. The present inventors have focused on the fact that if the channel state information of each other is known on the receiving side, more advanced MIMO processing can be applied, and throughput performance improvement can be expected. However, such a method has not yet been studied.

Therefore, the present inventors have conceived of a method for sharing CSI between UEs by using communication between terminals. According to one aspect of the present disclosure, operation related to MIMO is controlled (applied/switched) on the basis of shared CSI.

Hereinafter, embodiments according to the present disclosure will be described in detail with reference to the drawings. Radio communication methods according to the respective embodiments may be applied independently, or may be applied in combination.

In the present disclosure, the "distance" may be replaces with at least one of a "UE-base station distance" (for example, "own UE-base station distance") and a "UE-UE distance" (for example, "distance between own UE and another UE").

In the following embodiment, it is assumed that the UE measures or estimates the distance to at least one of the base station and another UE on the basis of a given distance measurement signal transmitted from at least one of the base station and the another UE, but the present invention is not limited thereto. The UE may acquire, derive, and the like the distance by an arbitrary method. Note that the distance measurement signal of the present disclosure may be replaced with at least one of a reference signal, a channel, a synchronization signal, and the like.

(Radio Communication Method)

An embodiment of the present disclosure relates to sharing of CSI between UEs.

The UE may measure CSI for a given channel and transmit it to another UE. The given channel may correspond to a channel of own UE and at least one of a base station (for example, gNB) and another UE. The CSI related to the given channel may be referred to as shared CSI or simply as CSI.

The UE may receive shared CSI from another UE.

The shared CSI may be periodically shared, semi-persistently shared, or aperiodically shared. These CSI sharing methods may be referred to as periodic CSI sharing, semi-persistent CSI sharing, and aperiodic CSI sharing, respectively. Note that the CSI sharing may mean at least one of transmitting CSI to share with another UE (which may also be referred to as CSI sharing transmission) and receiving CSI from another UE to share (which may also be referred to as CSI sharing reception). In the present disclosure, CSI sharing and shared CSI may be replaced with each other.

The UE may receive the configuration information for CSI sharing from the base station or another UE by higher layer signaling. The UE may transmit the configuration information for CSI sharing to another UE by using higher layer signaling. For example, the configuration information may include information such as timing of CSI sharing (for example, whether periodic CSI sharing, semi-persistent CSI sharing, or aperiodic CSI sharing is used), a resource for CSI sharing (for example, a time resource (such as a period) and a frequency resource), and whether CSI sharing transmission or reception is configured. Note that the configuration information of the CSI sharing transmission and the configuration information of the CSI sharing reception may be configured independently, or at least a part thereof may be configured in common.

Note that in the present disclosure, the higher layer signaling may be, for example, any one of radio resource control (RRC) signaling, medium access control (MAC) signaling, broadcast information, or a combination thereof.

The MAC signaling may use, for example, a MAC control element (MAC CE), a MAC protocol data unit (PDU), and the like. The broadcast information may be, for example, a master information block (MIB), a system information block (SIB), remaining minimum system information (RMSI), other system information (OSI), and the like.

The UE for which the periodic CSI sharing is configured may transmit or receive the shared CSI at a given period (for example, the period indicated by the higher layer parameter and the period defined by the specification).

The UE for which semi-persistent CSI sharing is configured may control whether or not to perform CSI sharing of a given period (for example, the period indicated by the higher layer parameter and the period defined by the specification) on the basis of an activation signal from the network or another UE.

The UE for which the aperiodic CSI sharing is configured may transmit or receive the shared CSI in response to a trigger signal (request signal) from the network or another UE as an opportunity.

Here, each of the activation signal, the trigger signal, and the like may be any one of MAC CE, downlink control information (DCI), and sidelink control information (SCI), or a combination thereof. Note that the SCI may be transmitted by the UE by using a physical sidelink control channel (PSCCH).

The configuration information for the CSI sharing, the activation signal, the trigger signal, and the like may include information for designating a sharing target. The UE may transmit or receive the shared CSI for the designated sharing target. For example, a specific UE, a UE satisfying a specific condition among all UEs, or the like may be designated as the sharing target.

The UE satisfying the specific condition may be a UE that is at a given range of distance from own UE. Further, the UE may determine whether or not to transmit (or receive) the shared CSI to at least one of the another UE and still another UE on the basis of at least one of the distance to the base station and the distance to the another UE.

The UE may transmit or receive the shared CSI using a channel for the shared CSI, or may transmit or receive the shared CSI on an existing channel (for example, a channel for a sidelink (PSCCH, a physical sidelink shared channel (PSSCH), a physical sidelink feedback channel (PSFCH), and the like)).

The shared CSI may include the same content as CSI (which may also be referred to as normal CSI) to be reported to the base station. The shared CSI may include, for example, one or more (for example, all) of amplitude information, phase information, and angle information of the channel. The shared CSI may be replaced with information for digital or analog beam correction. The shared CSI may be CSI based on configuration information for CSI sharing configured (in advance) for the UE, or may be CSI based on a higher layer parameter (for example, configuration information for CSI sharing notified from another UE) configured between the own UE and another UE.

At the timing of transmitting the shared CSI, the UE may perform control to transmit the shared CSI in a case where specific information included in the shared CSI falls within a given range (for example, exceeding a given threshold configured or specified in the specification), and not transmit (for example, skip, drop, or non-transmit) the shared CSI in a case where the specific information does not fall within the given range.

When transmitting the shared CSI, the UE may transmit a given notification together. For example, the given notification may include information (for example, a base station identifier (ID), a cell ID, a user identifier (UE ID), and the like) for specifying (or identifying) at least one of the base station and the UE related to the channel corresponding to the shared CSI. The UE may transmit the given notification to another UE instead of transmitting the shared CSI. The shared CSI may include the given notification.

Note that the UE ID may be a given radio network temporary identifier (RNTI), for example, a cell RNTI (C-RNTI).

The UE may transmit the shared CSI at the same timing as the sidelink feedback control information (SFCI), may transmit the shared CSI as SFCI, or may transmit the shared CSI at a timing different from the SFCI (independently). The SFCI may be transmitted by the UE by using the PSFCH, and may include at least one of HARQ-ACK, CSI, and the like for a sidelink.

When receiving the shared CSI from another UE, the UE may transmit delivery confirmation information (for example, ACK) corresponding to the reception of the shared CSI to the another UE.

When (1) receiving the shared CSI from another UE, (2) transmitting the shared CSI to another UE, or (3) receiving an ACK in response to the reception of the shared CSI from another UE, the UE may report the completion of sharing of the CSI to the network (for example, a base station) or another UE or still another UE. This report may be referred to as a CSI sharing completion report, simply a sharing completion report, or the like. The sharing completion report may include information (for example, the UE from which the shared CSI is transmitted, the UE ID corresponding to the UE to which the shared CSI is transmitted, and the like) indicating which UE has shared the information.

The UE may transmit the sharing completion report at the same timing as uplink control information (UCI), may report the sharing completion report as one piece of UCI (for example, CSI), or may report the sharing completion report at a timing different from the UCI (independently). Note that the UCI of the present disclosure may mean at least one of delivery confirmation information (for example, hybrid automatic repeat request acknowledgement (HARQ-ACK), scheduling request (SR), and channel state information (CSI).

The UE may transmit the sharing completion report by using a channel for sharing completion report, or may transmit the sharing completion report by using an existing channel (for example, a physical uplink shared channel (PUSCH), a physical uplink control channel (PUCCH), a physical random access channel (PRACH), or the like).

After receiving the sharing completion report, the base station may specify a plurality of UEs (which may be referred to as UE group) for which CSI sharing is completed. The base station may regard a plurality of UEs for which CSI sharing is completed as one UE, and control (for example, application, switching, and the like) an operation related to MIMO for the one UE.

The base station may determine or correct a common MIMO precoder (for example, at least one of a digital beam and an analog beam) for a plurality of UEs for which CSI sharing is completed, or may perform scheduling (for example, pairing of users applying MU-MIMO, selection of users applying SU-MIMO) for these UEs.

For a UE that has received shared CSI from another UE, additional antenna ports may be configured. For example, the UE that has received the shared CSI from another UE may control (for example, application, switching, and the like) the operation related to MIMO assuming that the shared CSI is information related to the additional antenna port.

Figure 1:
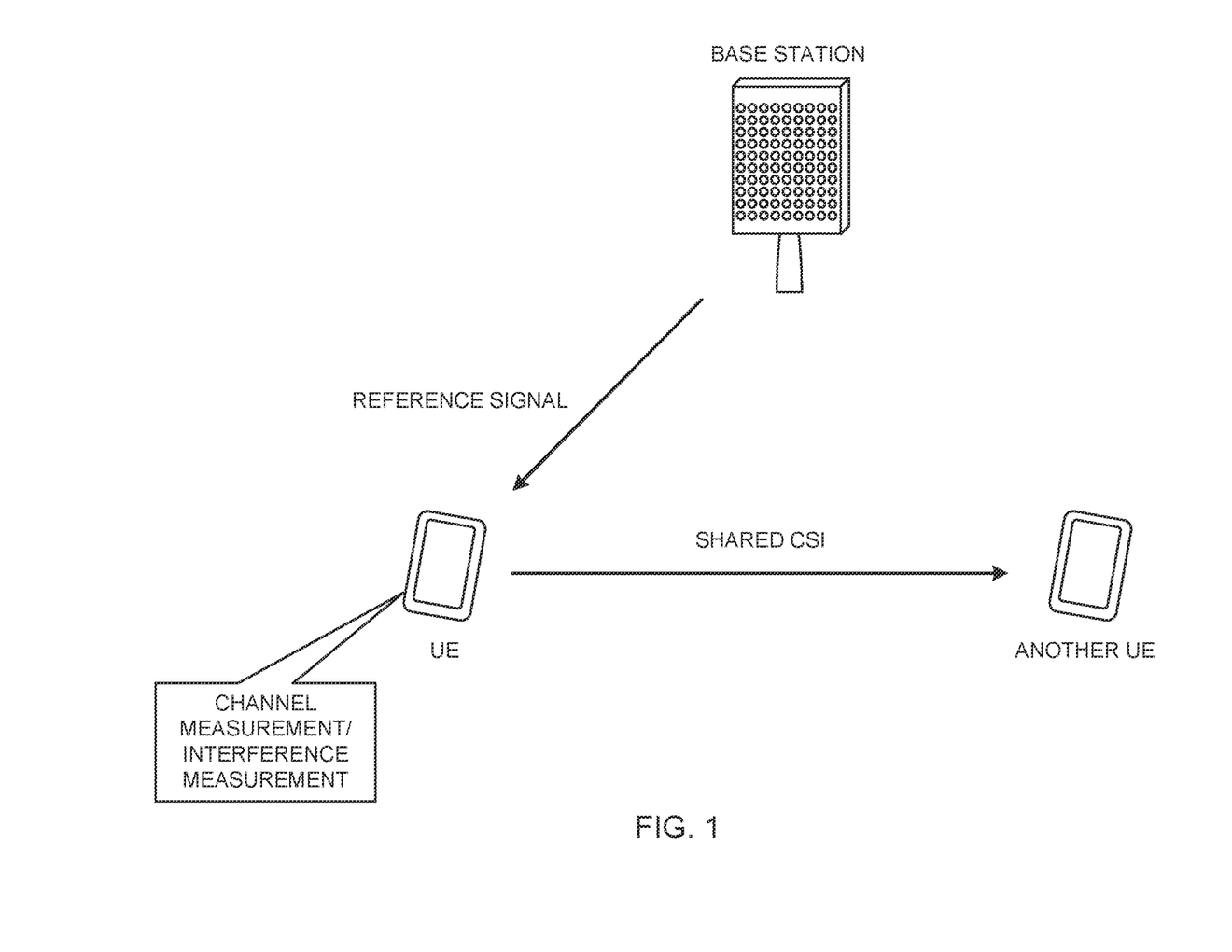
FIG. 1 is a diagram illustrating an example of CSI sharing according to one embodiment.

FIG. 1 is a diagram illustrating an example of CSI sharing according to one embodiment. In this example, the UE performs at least one of channel measurement and interference measurement on the basis of a resource (for example, a channel state information reference signal (CSI-RS) resource, a channel measurement resource, an interference measurement resource, or the like) configured by the base station.

Further, the UE is also configured to share CSI with another UE illustrated in the drawing. In this case, the UE may generate the shared CSI on the basis of at least one of the channel measurement and the interference measurement, and transmit the shared CSI to the another UE.

According to the embodiment of the present disclosure described above, CSI can be preferably shared between UEs.

Others

Note that the "distance" in the present disclosure may be replaced with at least one of received power (for example, RSRP), received quality (for example, RSRQ, RSSI, BLER, BER, PER), signal strength (for example, the RSSI), the number of times of trial, the number of times of transmission, the number of times of retransmission, a moving speed, and the like.

Here, the received power, the received quality, the signal strength, the number of times of trial, the number of times of transmission, the number of times of retransmission, and the like may be written by omitting "of a given signal (for example, a distance measurement signal, a given reference signal)". The moving speed may mean a moving speed of at least one of the UE, another UE, and a base station, or may mean a relative speed of two of these.

Further, at least one of "distance", "distance report", "information regarding distance", and the like in the present disclosure may be replaced with information (for example, location information (for example, latitude and longitude) and angle information of the UE, the base station, or another UE) that can be used to obtain the distance.

Further, at least one of "UE", "other UE", "another UE", and the like in the present disclosure may be replaced with, for example, a UE (which may be referred to as a head UE) that controls communication between UEs.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 2:
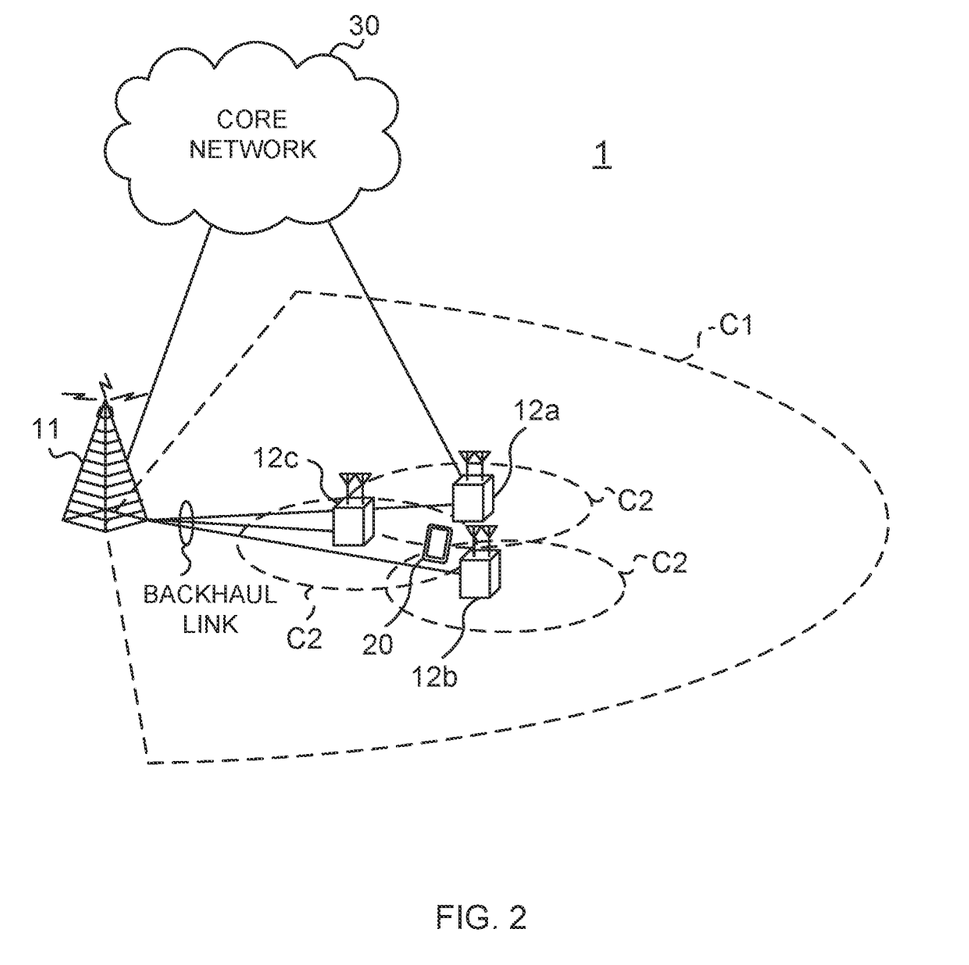
FIG. 2 illustrates one example of a schematic configuration of a radio communication system according to one embodiment.

FIG. 2 illustrates one example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminal 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and, for example, FR1 may correspond to a frequency range higher than FR2.

Further, the user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, a physical uplink shared channel (PUSCH) shared by each user terminal 20, a physical uplink control channel (PUCCH), a physical random access channel (PRACH), or the like may be used.

User data, higher layer control information, and a system information block (SIB) and the like are transmitted by the PDSCH. The PUSCH may transmit user data, higher layer control information, and the like. Further, the PBCH may transmit a master information block (MIB).

The PDCCH may transmit lower layer control information. The lower layer control information may include, for example, downlink control information (DCI) including scheduling information of at least one of the PDSCH and the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a given search space based on search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), and the like may be transmitted by the PUCCH. By means of the PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SS Block (SSB), and the like. Note that the SS, the SSB, or the like may also be referred to as a reference signal.

Further, in the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)."

(Base Station)

Figure 3:
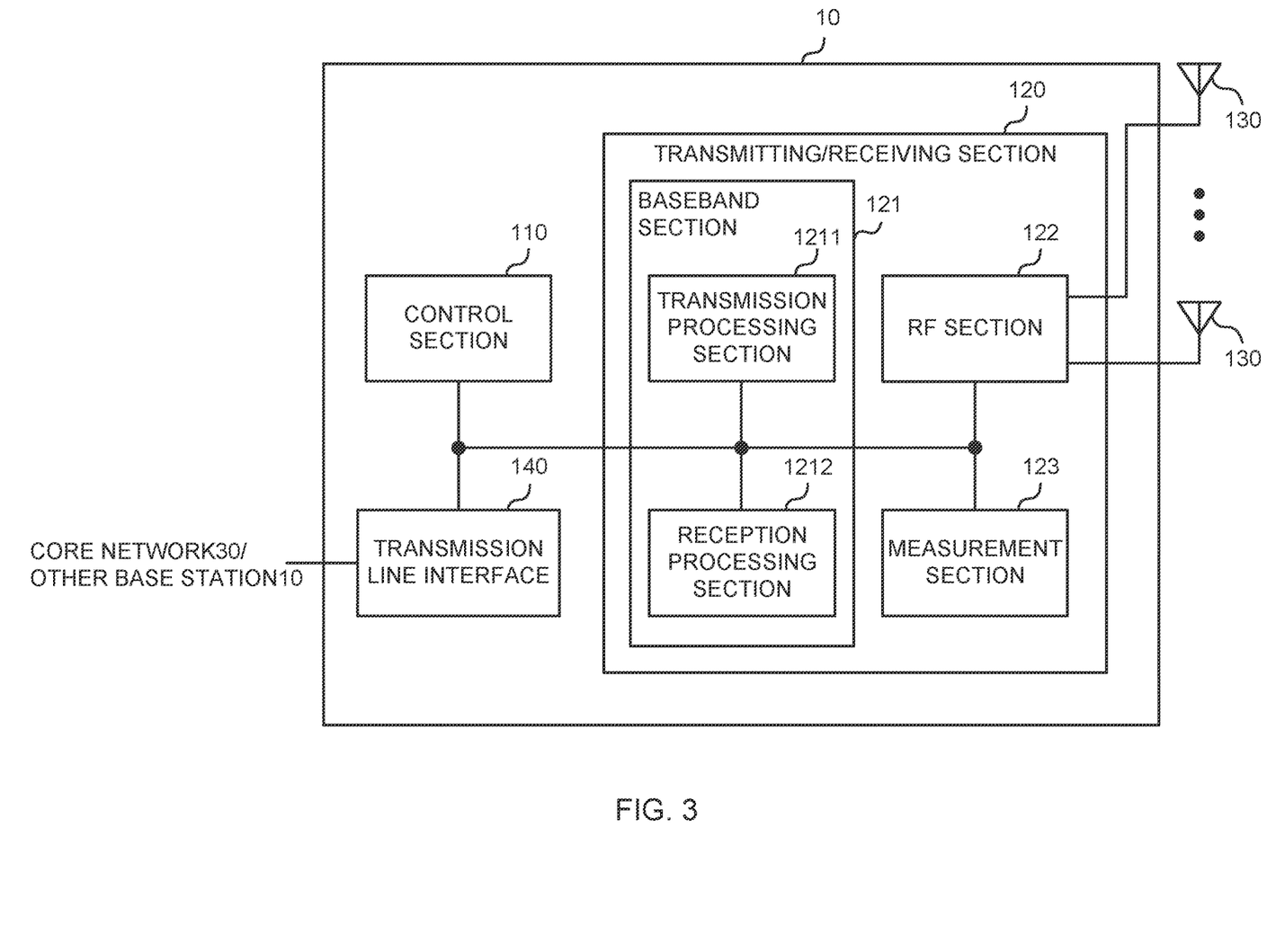
FIG. 3 illustrates one example of the configuration of a base station according to one embodiment.

FIG. 3 illustrates one example of the configuration of a base station according to one embodiment. The base station 10 includes a control section 110, a transmission/reception section 120, a transmission/reception antenna 130, and a transmission line interface 140. Note that one or more of the control sections 110, one or more of the transmission/reception sections 120, one or more of the transmission/reception antennas 130, and one or more of the transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmission/reception section 120, the transmission/reception antenna 130, and the transmission line interface 140. The control section 110 may generate data to be transferred as a signal, control information, a sequence, and the like, and may transfer the data, the control information, the sequence, and the like to the transmission/reception section 120. The control section 110 may perform call processing (such as configuration or release) of a communication channel, management of the state of the base station 10, and management of a radio resource.

The transmission/reception section 120 may include a baseband section 121, a radio frequency (RF) section 122, and a measurement section 123. The baseband section 121 may include a transmission processing section 1211 and a reception processing section 1212. The transmission/reception section 120 can be constituted by a transmitter/receiver, an RF circuit, a base band circuit, a filter, a phase shifter, a measurement circuit, a transmission/reception circuit, and the like, which are described based on common recognition in the technical field to which the present disclosure relates.

The transmission/reception section 120 may be constituted as an integrated transmission/reception section, or may be constituted by a transmission section and a reception section. The transmission section may be constituted by the transmission processing section 1211 and the RF section 122. The reception section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a transmission beam and a reception beam by using digital beam forming (for example, precoding), analog beam forming (for example, phase rotation), and the like.

The transmission/reception section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmission/reception section 120 (transmission processing section 1211) may perform transmission processing such as channel encoding (which may include error correcting coding), modulation, mapping, filtering processing, discrete Fourier transform (DFT) processing (if necessary), inverse fast Fourier transform (IFFT) processing, precoding, or digital-analog transform on the bit string to be transmitted, and may output a base band signal.

The transmission/reception section 120 (RF section 122) may perform modulation to a radio frequency band, filtering processing, amplification, and the like on the base band signal, and may transmit a signal in the radio frequency band via the transmission/reception antenna 130.

Meanwhile, the transmission/reception section 120 (RF section 122) may perform amplification, filtering processing, demodulation to a base band signal, and the like on the signal in the radio frequency band received by the transmission/reception antenna 130.

The transmission/reception section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired base band signal to acquire user data and the like.

The transmission/reception section 120 (measurement section 123) may perform measurement on the received signal. For example, the measurement section 123 may perform radio resource management (RRM) measurement, channel state information (CSI) measurement, and the like based on the received signal. The measurement section 123 may measure received power (e.g., reference signal received power (RSRP)), received quality (e.g., reference signal received quality (RSRQ), a signal to interference plus noise ratio (SINR), or a signal to noise ratio (SNR)), signal strength (e.g., received signal strength indicator (RSSI)), propagation path information (e.g., CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmission section and the reception section of the base station 10 in the present disclosure may be constituted by at least one of the transmission/reception section 120, the transmission/reception antenna 130, and the transmission line interface 140.

Note that the transmission/reception section 120 may receive information regarding the distance to the base station 10 or another user terminal 20 from the user terminal 20. The transmission/reception section 120 may receive information (for example, the UE ID) for identifying the base station 10 or the another user terminal 20 corresponding to the information regarding the distance.

The transmission/reception section 120 may receive, from the user terminal 20, a sharing completion report indicating that the shared CSI has been shared with another user terminal 20 or shared from another user terminal 20.

Note that, in the present disclosure, a spatial domain filter for transmission of a base station, a downlink spatial domain transmission filter, and a transmission beam of the base station may be replaced with each other. The spatial domain filter for reception of the base station, the uplink spatial domain receive filter, and the reception beam of the base station may be replaced with each other.

(User Terminal)

Figure 4:
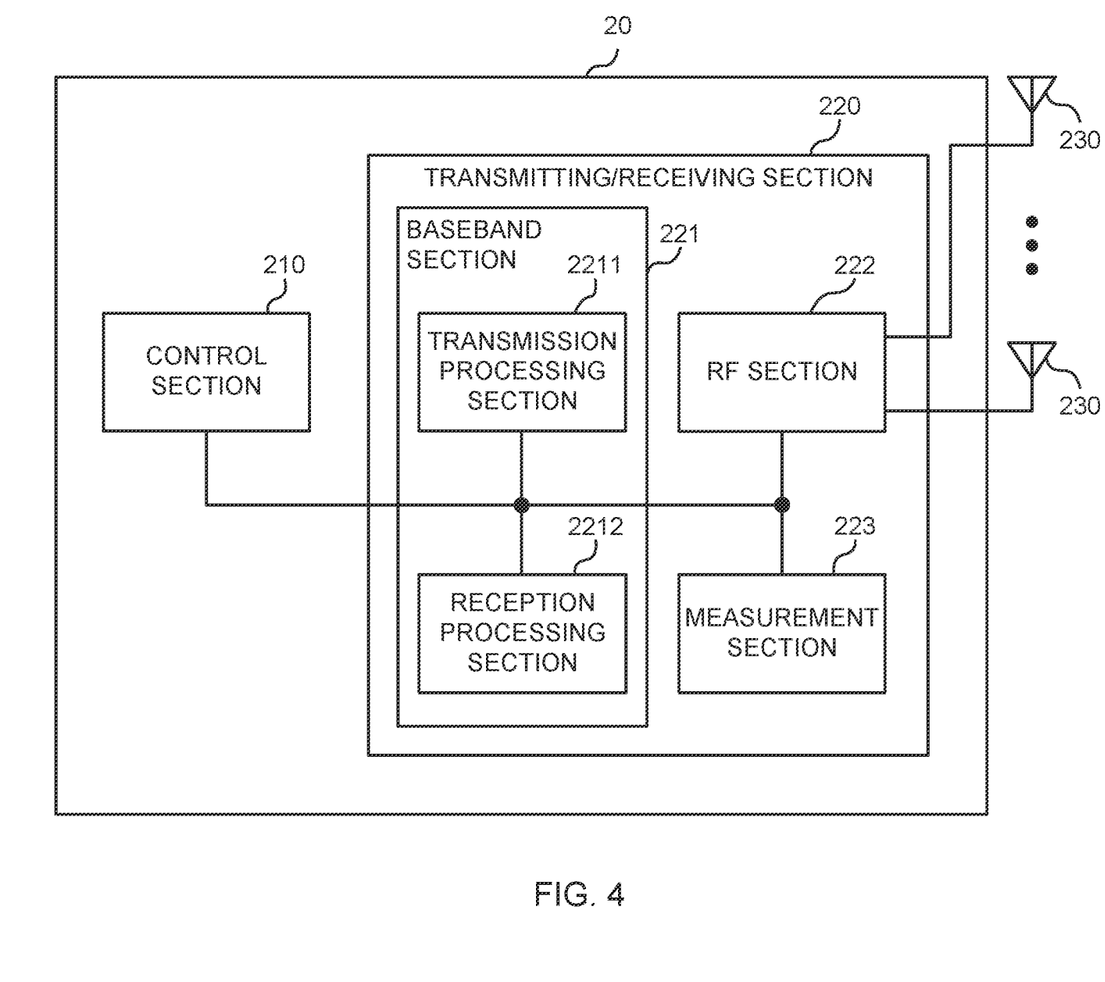
FIG. 4 illustrates one example of the configuration of user terminal according to one embodiment.

FIG. 4 illustrates one example of the configuration of user terminal according to one embodiment. The user terminal 20 includes a control section 210, a transmission/reception section 220, and a transmission/reception antenna 230. Note that one or more of the control sections 210, one or more of the transmission/reception sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmission/reception section 220 and the transmission/reception antenna 230. The control section 210 may generate data to be transmitted as a signal, control information, a sequence, and the like, and may transfer the data, the control information, the sequence, and the like to the transmission/reception section 220.

The transmission/reception section 220 may include a baseband section 221, an RF section 222, and a measurement section 223. The baseband section 221 may include a transmission processing section 2211 and a reception processing section 2212. The transmission/reception section 220 can be constituted by a transmitter/receiver, an RF circuit, a base band circuit, a filter, a phase shifter, a measurement circuit, a transmission/reception circuit, and the like, which are described based on common recognition in the technical field to which the present disclosure relates.

The transmission/reception section 220 may be constituted as an integrated transmission/reception section, or may be constituted by a transmission section and a reception section. The transmission section may be constituted by the transmission processing section 2211 and the RF section 222. The reception section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a transmission beam and a reception beam by using digital beam forming (for example, precoding), analog beam forming (for example, phase rotation), and the like.

The transmission/reception section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmission/reception section 220 (transmission processing section 2211) may perform transmission processing such as channel encoding (which may include error correcting coding), modulation, mapping, filtering processing, DFT processing (if necessary), IFFT processing, precoding, or digital-analog transform on a bit string to be transmitted, and may output a base band signal.

Note that whether or not to apply DFT processing may be determined based on configuration of transform precoding. When transform precoding is enabled for a channel (for example, PUSCH), the transmission/reception section 220 (transmission processing section 2211) may perform DFT processing as the transmission processing in order to transmit the channel using a DFT-s-OFDM waveform. When transform precoding is not enabled for a channel (for example, PUSCH), the transmission/reception section 220 (transmission processing section 2211) may not perform DFT processing as the transmission processing.

The transmission/reception section 220 (RF section 222) may perform modulation to a radio frequency band, filtering processing, amplification, and the like on the base band signal, and may transmit a signal in the radio frequency band via the transmission/reception antenna 230.

Meanwhile, the transmission/reception section 220 (RF section 222) may perform amplification, filtering processing, demodulation to a base band signal, and the like on the signal in the radio frequency band received by the transmission/reception antenna 230.

The transmission/reception section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired base band signal.

The transmission/reception section 220 (measurement section 223) may perform measurement on the received signal. For example, the measurement section 223 may perform RRM measurement, CSI measurement, and the like based on the received signal. The measurement section 223 may measure received power (e.g., RSRP), received quality (e.g., RSRQ, SINR, or SNR), signal strength (e.g., RSSI), propagation path information (e.g., CSI), and the like. The measurement result may be output to the control section 210.

Note that the transmission section and the reception section of the user terminal 20 in the present disclosure may include at least one of the transmission/reception section 220 and the transmission/reception antenna 230.

Note that the control section 210 may acquire a distance to the base station 10 or another user terminal 20. The transmission/reception section 220 may transmit the information regarding the distance.

The transmission/reception section 220 may transmit information (for example, the UE ID) for identifying the base station 10 or the another user terminal 20 corresponding to the information regarding the distance.

Note that the control section 210 may determine whether to share given channel state information (which may also be referred to as shared CSI) with another user terminal 20. The transmission/reception section 220 may transmit the given channel state information determined to be shared to the another user terminal 20.

The control section 210 may determine whether or not to share the given channel state information with the another user terminal 20 on the basis of the distance to the base station 10 or the other user terminal 20.

The transmission/reception section 220 may transmit a sharing completion report to the base station 10 or the another user terminal 20 after transmitting the given channel state information determined to be shared to the another user terminal 20. The transmission/reception section 220 may transmit a sharing completion report to the base station 10 or the another user terminal 20 after receiving the channel state information determined to be shared by the another user terminal 20 to the another user terminal 20.

Further, the transmission/reception section 220 may receive the channel state information (another shared CSI) determined to be shared by the another user terminal 20 from the another user terminal 20.

After receiving the channel state information (another shared CSI) determined to be shared by the another user terminal 20 from the another user terminal 20, the control section 210 may assume that the channel state information is information related to an additional antenna port. The additional antenna port referred to herein may be referred to as an antenna port that is not used by the own terminal, or may be referred to as an antenna port that does not perform transmission (or reception).

Note that, in the present disclosure, a spatial domain filter for transmission of the UE, an uplink spatial domain transmission filter, and a transmission beam of the UE may be replaced with each other. The spatial domain filter for reception of the UE, the downlink spatial domain receive filter, and the reception beam of the UE may be replaced with each other.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, wireless, or the like, for example) and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration unit) that causes transmission to function may be referred to as a transmitting unit, a transmitter, and the like. In any case, as described above, the implementation method is not particularly limited.

Figure 5:
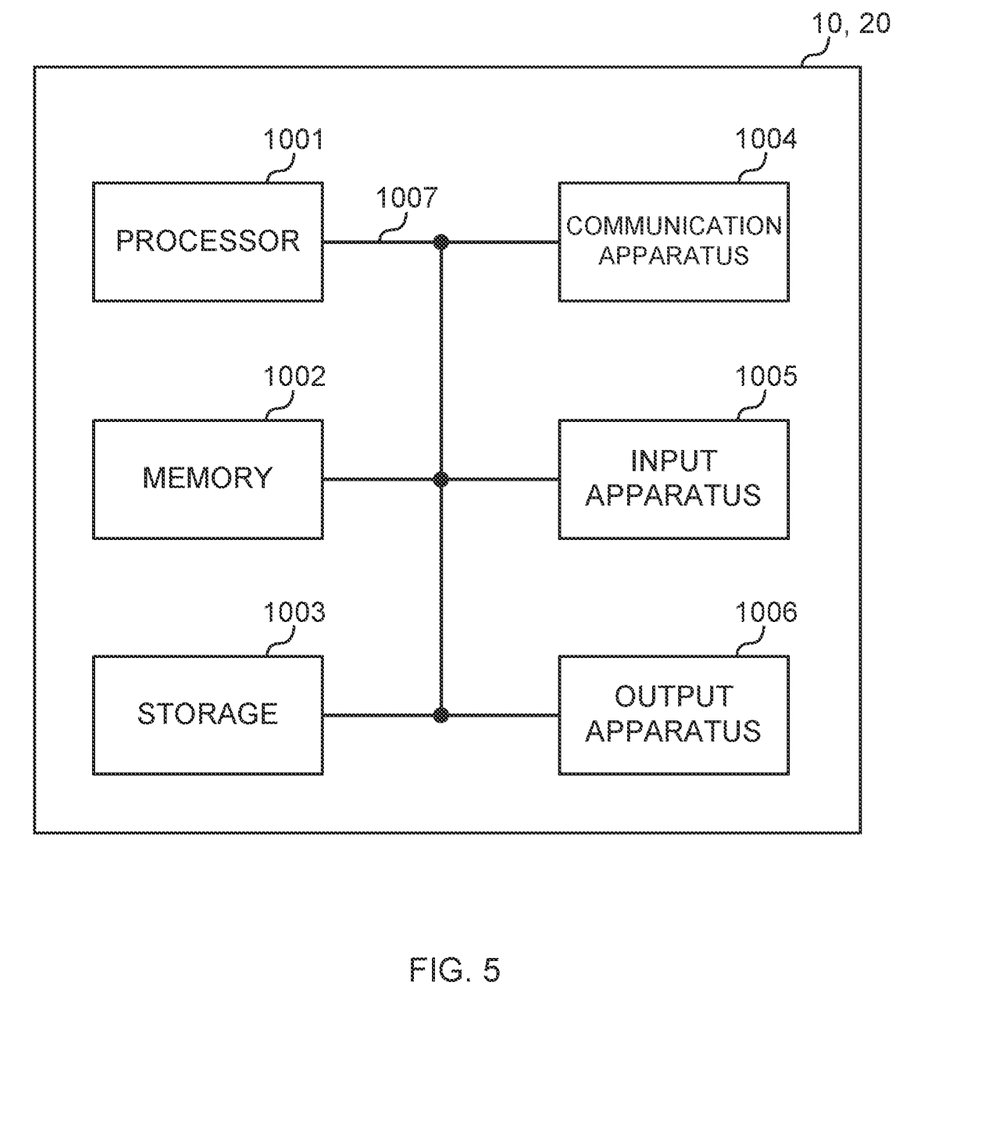
FIG. 5 illustrates one example of the hardware configuration of the base station and the user terminal according to one embodiment.

For example, the base station, the user terminal, and the like according to one embodiment of the present disclosure may function as a computer that executes the processing of the radio communication method of the present disclosure. FIG. 5 illustrates one example of the hardware configuration of a base station and a user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be configured to include one or a plurality of apparatuses illustrated in the drawings, or may be configured without including some apparatuses.

For example, although only one processor 1001 is illustrated, a plurality of processors may be provided. Further, the processing may be executed by one processor, or the processing may be executed in sequence or using other different methods simultaneously by two or more processors. Note that the processor 1001 may be implemented with one or more chips.

Each of functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 may control the whole computer by, for example, running an operating system. As the processor 1001, provided may be a central processing unit (CPU) including an interface with peripheral equipment, a control device, an operation device, a register, and the like. For example, at least a part of the above-described control section 110(210), transmission/reception section 120(220), and the like may be implemented by the processor 1001.

Furthermore, the processor 1001 reads programs (program codes), software modules, or data, from at least one of the storage 1003 and the communication apparatus 1004, into the memory 1002, and executes various processing according to these. As the program, a program to cause a computer to execute at least a part of the operation described in the above-described embodiment is used. For example, the control section 110(210) may be implemented by a control program that is stored in the memory 1002 and operates in the processor 1001, and another functional block may be implemented similarly.

The memory 1002 is a computer-readable recording medium, and may be constituted by, for example, at least one of a read only memory (ROM), an erasable programmable ROM (EPROM), an electrically EPROM (EEPROM), a random access memory (RAM) and/or other appropriate storage media. The memory 1002 may be referred to as a "register", a "cache", a "main memory (primary storage apparatus)", and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication by using at least one of a wired network and a wireless network, and may be referred to as, for example, a network device, a network controller, a network card, a communication module, and the like. The communication apparatus 1004 may be constituted by a high frequency switch, a duplexer, a filter, a frequency synthesizer, and the like in order to implement, for example, at least one of frequency division duplex (FDD) and time division duplex (TDD). For example, the transmission/reception section 120(220), the transmission/reception antenna 130(230), and the like described above may be implemented by the communication apparatus 1004. The transmission/reception section 120(220) may be implemented by physically or logically separating a transmission section 120a(220a) and a reception section 120b(220b) from each other.

The input apparatus 1005 is an input device for receiving input from the outside (for example, a keyboard, a mouse, a microphone, a switch, a button, a sensor and so on). The output apparatus 1006 is an output device that performs output to the outside (e.g., a display, a speaker, a light emitting diode (LED) lamp, and the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

Modification

Note that terms described in the present disclosure and terms necessary for understanding the present disclosure may be replaced with terms that have the same or similar meanings. For example, a channel, a symbol, and a signal (signal or signaling) may be read interchangeably. Further, the signal may be a message. A reference signal can be abbreviated as an "RS", and may be referred to as a "pilot", a "pilot signal", and the like, depending on which standard applies. Furthermore, a component carrier (CC) may be referred to as a cell, a frequency carrier, a carrier frequency, and the like.

A radio frame may include one or a plurality of periods (frames) in a time domain. Each of the one or plurality of periods (frames) constituting the radio frame may be referred to as a "subframe". Furthermore, a subframe may include one or a plurality of slots in the time domain. A subframe may be a fixed time duration (for example, 1 ms) that is not dependent on numerology.

Here, numerology may be a communication parameter applied to at least one of transmission and reception of a given signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

A slot may be constituted by one or a plurality of symbols in the time domain (orthogonal frequency division multiplexing (OFDM) symbols, single carrier frequency division multiple access (SC-FDMA) symbols, and the like). Also, a slot may be a time unit based on numerology.

A slot may include a plurality of mini slots. Each mini slot may include one or a plurality of symbols in the time domain. Further, the mini slot may be referred to as a "subslot". Each mini slot may include fewer symbols than a slot. PDSCH (or PUSCH) transmitted in a time unit larger than a mini slot may be referred to as PDSCH (PUSCH) mapping type A. A PDSCH (or PUSCH) transmitted using a mini slot may be referred to as PDSCH (PUSCH) mapping type B.

A radio frame, a subframe, a slot, a mini slot, and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of contiguous subframes may be referred to as TTI, or one slot or one mini slot may be referred to as TTI. That is, at least one of the subframe and TTI may be a subframe (1 ms) in the existing LTE, may be a period shorter than 1 ms (e.g., one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in the LTE system, a base station performs scheduling to allocate radio resources (a frequency bandwidth and transmission power that can be used in each user terminal and the like) to each user terminal in TTI units. Note that the definition of TTIs is not limited to this.

The TTI may be the transmission time unit of channel-encoded data packets (transport blocks), code blocks, codewords, or the like, or may be the unit of processing in scheduling, link adaptation, or the like. Note that, when the TTI is given, a time interval (for example, the number of symbols) to which the transport block, code block, codeword, or the like is actually mapped may be shorter than the TTI.

Note that, when one slot or one mini slot is referred to as a "TTI," one or more TTIs (that is, one or more slots or one or more mini slots) may be the minimum time unit of scheduling. Also, the number of slots (the number of mini slots) to constitute this minimum time unit of scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (for example, a usual TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of contiguous subcarriers in the frequency domain. The number of subcarriers included in the RB may be the same regardless of the numerology, and may be twelve, for example. The number of subcarriers included in the RB may be determined based on the numerology.

Also, an RB may include one or more symbols in the time domain, and may be one slot, one mini slot, one subframe or one TTI in length. One TTI, one subframe, and the like each may be constituted by one or a plurality of resource blocks.

Note that one or a plurality of RBs may be referred to as a physical resource block (PRB (Physical RB)), a subcarrier group (SCG (Sub-Carrier Group)), a resource element group (REG), a PRB pair, an RB pair, or the like.

Furthermore, a resource block may be constituted by one or a plurality of resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. The PRB may be defined in a given BWP and be numbered within the BWP.

The BWP may include BWP for UL (UL BWP) and BWP for DL (DL BWP). For the UE, one or a plurality of BWPs may be configured within one carrier.

At least one of the configured BWPs may be active, and it may not be assumed that the UE transmits and receives a given signal/channel outside the active BWP. Note that a "cell", a "carrier", or the like in the present disclosure may be replaced with the "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Further, the information, parameters, and the like described in the present disclosure may be represented using absolute values or relative values with respect to given values, or may be represented using other corresponding information. For example, a radio resource may be specified by a given index.

The names used for parameters and the like in the present disclosure are in no respect limiting. Furthermore, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signal, and the like to be input and/or output can be overwritten, updated or appended. The output information, signal, and the like may be deleted. The information, signals and so on that are input may be transmitted to other pieces of apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, and the like. Further, a notification of MAC signaling may be given using, for example, MAC control elements (MAC control elements (CEs)).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or a plurality of (for example, three) cells. When a base station accommodates a plurality of cells, the entire coverage area of the base station can be partitioned into a plurality of smaller areas, and each smaller area can provide communication service through base station subsystems (e.g., indoor small base stations (remote radio heads (RRHs))). The term "cell" or "sector" refers to a part or the whole of a coverage area of at least one of a base station and a base station subsystem that perform a communication service in this coverage.

In the present disclosure, the terms such as "mobile station (MS)", "user terminal (user terminal)", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving object, a moving object itself, and the like. The moving object may be a transportation (for example, a car, an airplane and the like), an unmanned moving object (for example, a drone, an autonomous car, and the like), or a (manned or unmanned) robot. Note that at least one of the base station and the mobile station also includes a device that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-mentioned base station 10. In addition, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20.

In the present disclosure, the operation performed by the base station may be performed by an upper node thereof in some cases. In a network including one or a plurality of network nodes with base stations, it is clear that various operations performed for communication with a terminal can be performed by a base station, one or a plurality of network nodes (examples of which include but are not limited to mobility management entity (MME) and serving-gateway (S-GW)) other than the base station), or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined (for example, a combination of LTE or LTE-A and 5G) and applied.

The phrase "on the basis of" as used in the present disclosure does not mean "on the basis of only", unless otherwise specified. In other words, the phrase "based on" means both "based only on" and "based at least on."

Any reference to an element using designations such as "first" and "second" used in the present disclosure does not generally limit the amount or order of these elements. These designations may be used in the present disclosure only for convenience, as a method for distinguishing between two or more elements. In this way, reference to the first and second elements does not imply that only two elements may be employed, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

Further, "determining" may be replaced with "assuming", "expecting", "considering", and the like.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the phrase may mean that "A and B are different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided for the purpose of exemplification and explanation, and has no limitative meaning to the invention according to the present disclosure.

The invention claimed is:

1. A terminal comprising:
    a processor that determines whether or not to share a given channel state information with another terminal;
    a transmitter that transmits the given channel state information determined to be shared to the another terminal; and
    a receiver that receives a common Multi Input Multi Output (MIMO) precoder for a terminal group for which channel state information sharing is completed,
    wherein after the receiver receives the given channel state information determined to be shared with the another terminal from the another terminal, the processor assumes that the given channel state information is information related to an additional antenna port that is not used by the terminal or that does not perform transmission or reception, and
    wherein after the transmitter transmits the given channel state information determined to be shared with the another terminal, the transmitter transmits a sharing completion report to a base station or to the another terminal.

2. The terminal according to claim 1, wherein the processor determines whether or not to share the given channel state information with the another terminal based on a distance to a base station or the another terminal.

3. A radio communication method of a terminal, the method comprising:
    determining whether or not to share a given channel state information with another terminal;
    transmitting the given channel state information determined to be shared to the another terminal;
    receiving a common Multi Input Multi Output (MIMO) precoder for a terminal group for which channel state information sharing is completed;
    after receiving the given channel state information determined to be shared with the another terminal from the another terminal, assuming that the given channel state information is information related to an additional antenna port that is not used by the terminal or that does not perform transmission or reception; and
    after transmitting the given channel state information determined to be shared with the another terminal, transmitting a sharing completion report to a base station or to the another terminal.

* * * * *